Dec. 26, 1944.   M. O. TROY   2,366,071
STATIONARY INDUCTION APPARATUS
Original Filed May 25, 1939   2 Sheets-Sheet 1
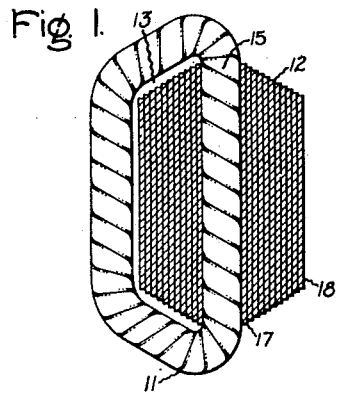
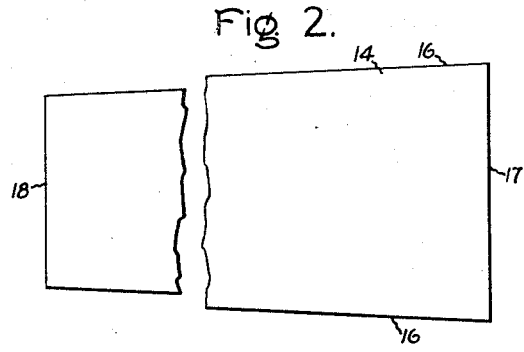
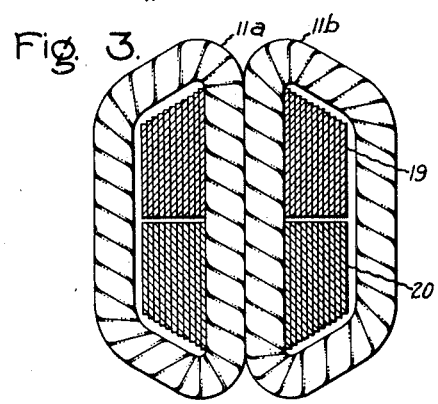
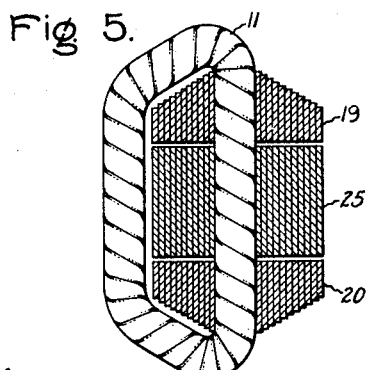
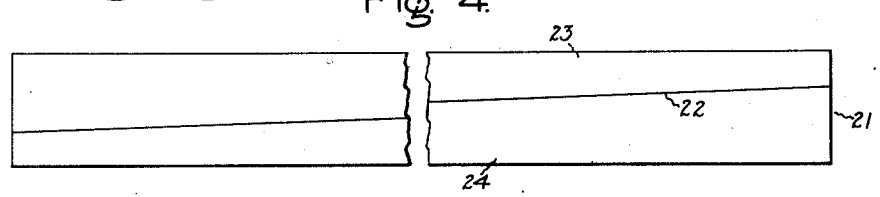
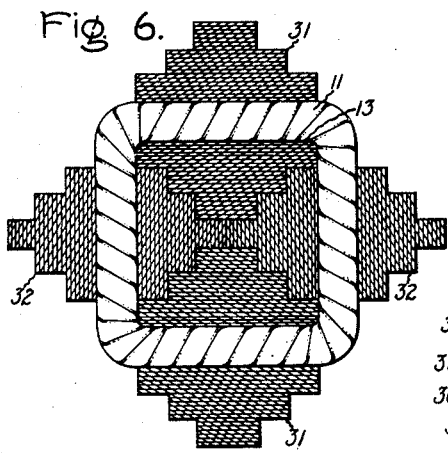
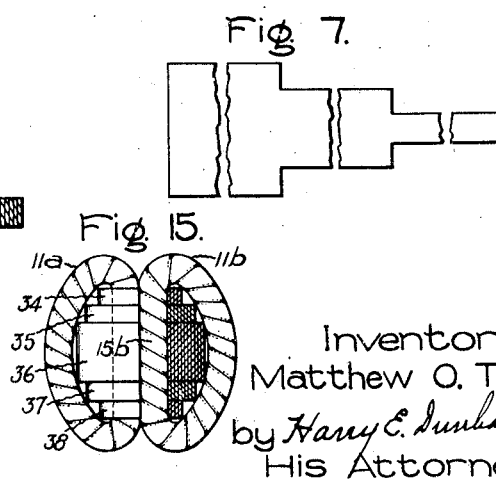
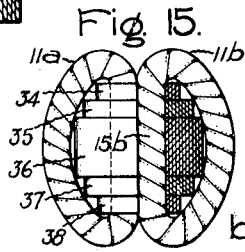
Inventor:
Matthew O. Troy,
by Harry E. Dunham
His Attorney.

Dec. 26, 1944.  M. O. TROY  2,366,071
STATIONARY INDUCTION APPARATUS
Original Filed May 25, 1939   2 Sheets-Sheet 2
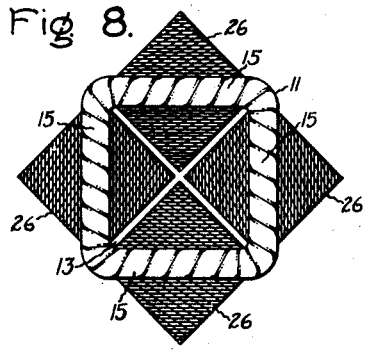
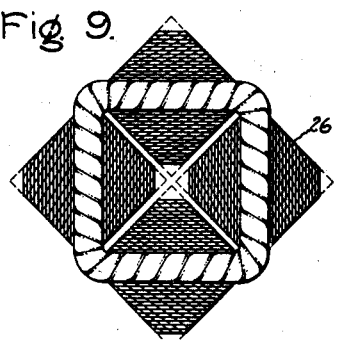
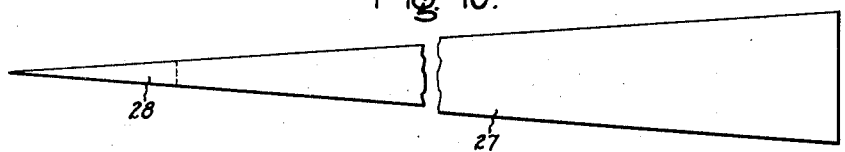
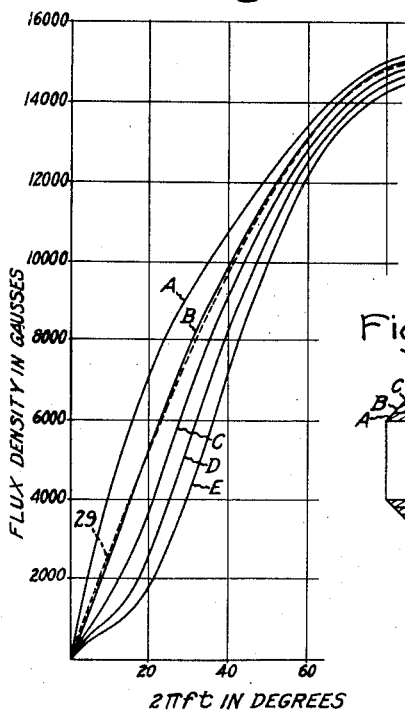
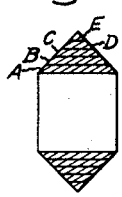
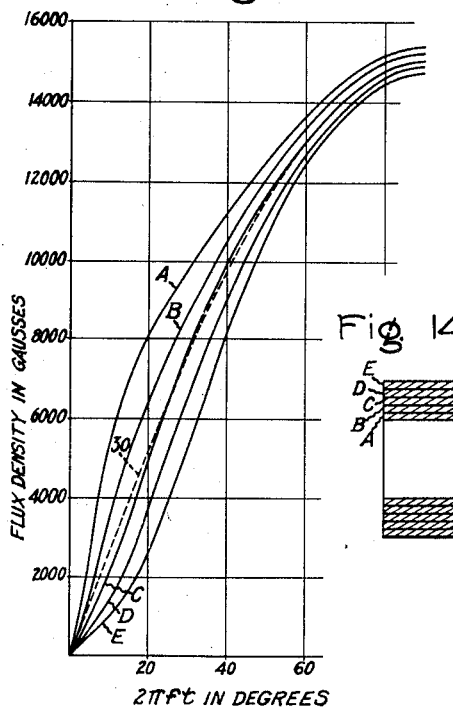
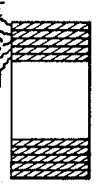
Inventor:
Matthew O. Troy,
by Harry E. Dunham
His Attorney.

Patented Dec. 26, 1944

2,366,071

UNITED STATES PATENT OFFICE 2,366,071

STATIONARY INDUCTION APPARATUS

Matthew O. Troy, Schenectady, N. Y., assignor to General Electric Company, a corporation of New York Original application May 25, 1939, Serial No. 275,625. Divided and this application March 27, 1942, Serial No. 436,505

2 Claims. (Cl. 175—356)

This application is a division of my copending application, Serial No. 275,625, filed May 25, 1939, and which issued as Patent 2,314,912 on March 30, 1943.

My invention relates to stationary induction apparatus and has for its object the provision of improved transformers and reactors of the wound core type with increased efficiency and more effective utilization of magnetic material, with reduced difference in flux density between different parts of the magnetic core, and with reduced mean length of magnetic circuit.

Other and further objects and advantages will become apparent as the description proceeds.

In carrying out my invention in its preferred form, I utilize preformed form-wound conductive windings and magnetic cores or rings composed of strip material wound spirally flatwise around one or more legs of the conductive winding structure. For forming the core I utilize magnetic strip material which is tapered or varies in width so as to produce a core having a trapezoidal, triangular, or stepped cross-section, the maximum width of the layers of core strip being adjacent the winding leg and the minimum width being at the outer periphery of the magnetic core.

The invention may be understood more readily from the following detailed description when considered in connection with the accompanying drawings, and those features of the invention which are believed to be novel and patentable will be pointed out in the claims appended hereto. In the drawings Fig. 1 is an elevation partially in cross-section and diagrammatical in form representing a transformer or reactor constructed in accordance with one embodiment of my invention. Fig. 2 is a broken plan view representing diagrammatically the shape of the strip utilized in winding the core of the stationary induction apparatus illustrated in Fig. 1. Fig. 3 is an elevation partially in section and diagrammatical in form representing a modification of the arrangement of Fig. 1 in which the conductive winding structure is divided into a plurality of parts and the strip core is divided into two parts for the purpose of convenience and economy in manufacturing operations. Fig. 4 is a diagrammatical plan view of a length of magnetic strip illustrating the manner of slitting it to form strips of the proper shape for forming the parts of the core of the apparatus of Fig. 3. Fig. 5 is a plan view partially in section illustrating a further modification of the arrangement of Figs. 1 and 3. Fig. 6 is a plan view partially in cross-section, diagrammatical in form, illustrating another embodiment of my invention in which magnetic cores are used having cross-sections which are stepped in contour. Fig. 7 is a diagrammatical plan view illustrating the shape of strip which may be utilized in winding the core parts of the apparatus of Fig. 6. Fig. 8 is an elevation partially in cross-section illustrating another embodiment of my invention in which triangular cross-section cores are utilized. Fig. 9 is an illustration of a modification of the arrangement of Fig. 8; and Fig. 10 is a broken plan view diagrammatically illustrating the shape of strip which is utilized in winding the core parts of the apparatus of Figs. 8 and 9. Figs. 11 and 12 are graphs showing the variation in flux density with time throughout a quarter of a cycle of a flux wave in the various sections of magnetic cores of triangular and rectangular cross-section, respectively, of the proportions illustrated in Figs. 13 and 14, respectively. Fig. 15 is an elevation, partially in section, of another modified arrangement. Like reference characters are utilized throughout the drawings to designate like parts.

The losses in stationary induction apparatus such as transformers and reactors having cores composed of magnetic material depend upon the flux densities at which the core material in various elements of the core are operated and the total volume of the core, both of which depend upon the mean length of magnetic circuit of the successive core elements of different radius. The distribution of flux among the core elements depends upon their relative reluctances. In accordance with my invention I so design the magnetic cores that the width of successive elements of the core becomes less as the elements are further from the winding, so as to have the greatest cross-sectional area in the core elements of least circuit length. In this manner I reduce the mean length of the magnetic circuit of the core, tend to equalize the flux density throughout the elements of the core and reduce the necessary amount of core material for a given rating of transformer.

In the arrangement of Fig. 1, I provide a stationary induction apparatus with a core having a trapezoidal cross-section and conically shaped ends. The apparatus consists of a conductive winding structure 11 and a wound strip magnetic core 12 in the form of a ring linking the winding structure. The winding structure 11, which may be a single coil of insulated wire in the case of a reactor, or a structure composed of several independent coils bound together by insulation in the case of a transformer, may either be of the preformed form-wound type or the hand-wound type, but the form-wound type is preferable since winding structures of this type may be better insulated so as to be more reliable as well as being less expensive to produce. The conductive winding structure 11, shown with an insulating wrapping, may be D-shaped having a conductive-winding window 13 which is roughly D-shaped or trapezoidal in shape, conforming as nearly as practicable to the cross-sectional shape of the core 12.

The core 12 is composed of a strip 14 (Fig. 2) of magnetic sheet material, such as cold rolled 3 per cent silicon strip, for example, wound spirally flatwise around the side or leg 15 of the winding structure 11 and closely embracing it. The winding leg 15 is formed with a straight portion the length of which approaches as nearly as practicable the maximum dimension of the winding window 13. The strip 14 is tapered having both of the sides 16 slanting inward from the wide end 17 toward the narrow end 18 of the strip, the wide end 17 being applied next to the winding leg 15 and the narrow end 18 being at the outer periphery of the core 12. The assembly is made rigid and secure by fastening the outer end 18 of the strip in any suitable manner as by spot welding it to the underlying layer of strip. It will be understood that for the sake of clarity in the drawings the taper of the strip 14 is considerably exaggerated. A very much smaller taper would be necessary in order to produce the widths shown at 17 and 18 in a strip of the requisite length to build up the core 12. Furthermore, it will be understood that the thickness of the successive layers of strip in the core 12 (Fig. 1) is exaggerated for the sake of clarity in the drawings. In actual practice a considerably greater number of layers of strip would be employed in induction apparatus of the ordinary commercial sizes, a suitable thickness of strip being approximately 11 to 14 mils, for example.

The preferred method of applying the magnetic strip material to the winding leg does not constitute part of my present invention. A suitable method of application is described, however, in the copending application, Serial No. 123,249, filed January 30, 1937, of John C. Granfield, assigned to the same assignee as the present application, and in an article by Edward D. Treanor entitled "The wound core distribution transformer," published in "Electrical Engineering" November 1938, volume 57, Transaction section, pages 622 to 625.

It will be apparent to those skilled in manufacturing operations that the provision of tapered strip of the shape shown in Fig. 2 presents certain difficulties in convenient and economical production. To obviate such difficulties a divided core composed of parts 19 and 20 may be utilized, as shown in Fig. 3, each part having a conical end and an end which is substantially flat and perpendicular to the core axis. Strips of the proper shape for forming the core parts 19 and 20 may be formed from a single uniform width of strip 21 by slitting along a diagonal line as shown in Fig. 4. The uniform-width strip 21 is slit along the diagonal line 22 to form two separate strips 23 and 24 each of which has a slanting side and a side which is straight or parallel to the lengthwise direction of the strip and perpendicular to the ends of the strip. If desired, the arrangement of Fig. 5 may also be employed in which two core parts 19 and 20 may be provided, each conical at one end, wound from strips shaped as shown at 23 and 24 in Fig. 4, together with one or more rectangular-section flat-ended core parts 25 wound from a uniform-width strip. In Figs. 1 and 5 I have shown a stationary induction apparatus having a single unitary conductive winding structure 11 but it will be understood that a conical-ended magnetic core wound from tapered strip may also be utilized in connection with conductive winding structures divided into two or more parts, such as 11a and 11b, as shown in Fig. 3.

My invention is not limited to providing cores with a D-shaped or trapezoidal cross-section, but includes cores having substantially triangular cross-section. It also includes stationary induction apparatus having cores or core parts wound on more than one winding leg. In the arrangement of Fig. 8 there is a conductive winding structure 11 having a plurality of straight sides, in this case shown as four in number, and equal in length so as to form a square winding structure having a square coil opening or window 13. In order substantially to fill the window 13, triangular-cross-section cores or core parts 26 having axial lengths corresponding to the straight portions of the winding legs are wound upon each of the winding legs 15. Since the winding structure 11 is square, the cross-sections of the cores 26 are preferably substantially right triangles, and it will be understood that if a polygonal winding structure with a different number of sides than four were employed, the apex angles of the cross-section of the core parts 26 would preferably be varied accordingly in order to have the conductive winding window 13 substantially filled by magnetic core material for the sake of maximum space factor and economy of iron and copper.

In actual practice I have found that it is more convenient not to attempt to form perfect triangles in the cross-sections of the cores 26 but to omit the extreme tips or apices of the triangles so as to form a cross-section similar to that shown in Fig. 9, which I find will give substantially the same results as a perfect triangular cross-section as represented in Fig. 8.

It will be understood that the triangular cross-section core parts 26 of Fig. 8 may be formed by winding substantially triangular strips of magnetic material of the shape shown in Fig. 10 around the winding legs 15. In Fig. 10 also, the taper is exaggerated for the sake of clarity. The extreme end 28 of the strip 27 tends to become fragile and difficult to handle and is, therefore, omitted in the tapered strip for producing the cross-section shown in Fig. 9.

Mathematical analysis indicates that in the case of wound strip magnetic cores having an outer diameter twice the inner diameter, a saving of approximately 11 per cent in iron losses and in weight may be effected by utilizing four substantially triangular section core parts, instead of two rectangular section cores of the same total cross-sectional area. This may be accounted for, I believe, by the difference in the mean length of magnetic circuit of the two shapes and by the differences in the relative flux densities in successive core elements at different distances from the winding leg. The relative flux densities at given instants of time in the flux wave are illustrated in the graphs of Figs. 11 and 12. These graphs show the flux density in solid lines for each of five successive core elements and show the mean flux density in dotted lines. In the graphs of Figs. 11 and 12 the ordinates measured in the vertical direction represent the flux densities in Gausses and the abscissae measured in the horizontal direction represent time in the alternating current wave expressed in electrical degrees. The curves A, B, C, D, and E in Fig. 11 represent the flux densities in the core elements A, B, C, D, and E, respectively, of the core shown in Fig. 13, and the curves A, B, C, D, and E of Fig. 12 represent the flux densities in the core elements A B, C, D, and E, respectively, of the rectangular-cross-section core represented in Fig. 14. The dotted curve 29 represents the mean flux density in the core of Fig. 13 and the dotted curve 30 represents the mean flux density in the rectangular-section-core of Fig. 14. It will be seen that in the curves of Fig. 12 there is a greater disparity between the flux densities in the individual core elements and the mean flux density than in the curves of Fig. 11. In Fig. 12 three of the core elements have flux densities as great or greater than the mean flux density throughout the greater portion of the alternating current cycle, whereas in Fig. 11 only two of the core elements have flux densities as great or greater than the mean flux density. Lack of uniformity in flux density is a disadvantage owing to the fact that, since losses increase very greatly with increase in flux density, the excessive flux density in one portion of the core, necessitated by lack of uniformity, disproportionately increases the losses. Thus in my improved core the parts are each formed by winding a tapered magnetic strip spirally flatwise around the winding leg so that each part has a substantially uniform cross section around the winding leg and the width of successive layers of the core part progressively decreases toward the outer periphery thereof so as to tend to equalize the magnetic flux in the layers of each of the parts.

In the foregoing explanation the tapered strips 17, 23, 24, and 27, employed to form the trapezoidal and triangular-section-cores, have been assumed to have substantially straight-line sides. It will be understood, however, that strip with strictly straight-line sides or truly triangular strip wound into a core would form a core of cross-section slightly parabolical. In the construction of Figs. 8 and 9 such cross-section shapes would tend to diminish the space factor of the core and slightly curved or concave sides of the strip 27 would be desirable in order to produce perfect triangular cross-section core parts and a core with the maximum space factor. On the other hand, in stationary induction apparatus of the type illustrated in Figs. 1, 3 and 5 having D-shaped windings, the shape of the conductive winding window may be adapted to the optimum shape of cross-section of the core. It will be apparent from Figs. 11 and 12 that a further refinement in obtaining uniformity of flux density may be obtained by utilizing a core of cross-section with tapered sides deviating slightly from triangular cross-section. The ideal section in any case will depend upon the flux densities used and the characteristics of the magnetic material, as will be understood by those skilled in the art. As will be apparent from an observation of the cores of Fig. 11 further improvement in the degree of uniformity of flux density will be obtained by making the cross-section of the core slightly parabolical so as to diminish relatively the cross-sections of the core elements C, D, and E thereby tending to make their flux densities more nearly the same as the flux densities in the core elements A and B.

In the arrangements thus far described the magnetic core parts have cross-sections with substantially straight sides resulting from the use of progressively tapering strip. However, my invention is not limited to these precise arrangements and I have found that satisfactory results may also be obtained by the use of cores or core parts with stepped sides so that each core part comprises a plurality of core elements or rings which change abruptly in axial length, as illustrated, for example, in Fig. 6. This feature is illustrated in connection with a square conductive winding structure, but obviously is not limited thereto, and may be employed in connection with D-shaped windings and polygonal windings as well. In the arrangement of Fig. 6, however, for the sake of obtaining maximum space factor I so arrange the dimensions of the successive core elements as to have the core parts interfit and fill the window 13 in the winding 11. The core parts 31 are each composed of three core elements of successively decreasing width of strip or axial length of ring, meeting at the center. The core parts 32 are each composed of three elements touching the edges of the inner elements of the core parts 31. In assembling the apparatus of Fig. 6 the core parts 31 may be wound on to the winding 11 first, utilizing a strip of magnetic sheet material, such as shown in Fig. 7, consisting of a plurality of strips of different widths welded together end to end. In winding the core parts 32 on the remaining two winding legs it may be more convenient to utilize separate strips of successively decreasing widths in winding the successive core elements and to weld the successive strips in place as each preceding core element is completed.

A strip, such as shown in Fig. 7, may be used to form an integral core of stepped cross-section for a D-shaped conductive winding. A core having the same external appearance may also be formed by utilizing a plurality of strips of the same or different widths but different lengths to form a core made up of a plurality of parts 34, 35, 36, 37, and 38 as shown in Fig. 15. In the latter figure, the left-hand side represents an elevation of the conductive winding and core, and the right-hand side represents a cross-section of the core with half the conductive winding leg 15b exposed.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. Stationary induction apparatus comprising a substantially straight-sided conductive winding structure of the approximate shape of a polygon, and a magnetic core comprising a plurality of core parts each of which surrounds one of the sides of said conductive winding structure, each core part being composed of tapered magnetic strip material wound spirally flatwise upon the winding leg and having a substantially uniform cross section around the winding leg, the widest part of the strip being at the inside of the core adjacent the winding leg whereby the cross-section of successive layers of core progressively decreases toward the outer periphery thereof to tend to equalize the magnetic flux density of said layers of core.

2. Stationary induction apparatus comprising a substantially rectangular conductive winding structure having four substantially straight legs and a core composed of four core parts each of which surrounds one of said winding legs, each of said parts being composed of tapered magnetic strip material wound spirally flatwise upon the winding leg and having a substantially uniform cross section around the winding leg, the widest part of the strip corresponding approximately in width to the length of the straight portion of the winding leg and the widest part of the strip being at the inside of the core part adjacent the winding leg whereby the cross-section of successive layers progressively decreases toward the outer periphery thereof to tend to equalize the magnetic flux density in said layers of core, said strips being of such length as to form a ring-shaped core with a radial depth approximately equal to one-half the width of the winding window and being so tapered as to produce a substantially triangular cross-section whereby the coil window is substantially filled by four substantially triangular-section core parts and high space factor is obtained.

MATTHEW O. TROY.